(12) United States Patent
Ting

(10) Patent No.: US 6,771,439 B2
(45) Date of Patent: Aug. 3, 2004

(54) ZOOM LENS CONTROL MECHANISM

(75) Inventor: Tim Ting, Shing Juang (TW)

(73) Assignee: Nucam Corporation, Taipei (TW)

( * ) Notice: Subject to any disclaimer, the term of this patent is extended or adjusted under 35 U.S.C. 154(b) by 0 days.

(21) Appl. No.: 10/345,273

(22) Filed: Jan. 16, 2003

(65) Prior Publication Data

US 2003/0137747 A1 Jul. 24, 2003

(30) Foreign Application Priority Data

Jan. 18, 2002 (TW) ..................................... 91200459 U

(51) Int. Cl.[7] .............................................. G02B 7/02
(52) U.S. Cl. ....................... 359/822; 359/699; 359/700; 359/701; 359/704; 359/694; 359/819

(56) References Cited

U.S. PATENT DOCUMENTS

| | | | | |
|---|---|---|---|---|
| 5,270,868 A | * | 12/1993 | Nomura ....................... | 359/700 |
| 5,581,411 A | * | 12/1996 | Nomura et al. ............. | 359/694 |
| 5,966,248 A | * | 10/1999 | Kurokawa et al. .......... | 359/697 |
| 6,072,639 A | * | 6/2000 | Onda .......................... | 359/694 |
| 2002/0036835 A1 | * | 3/2002 | Nomura et al. ............. | 359/693 |

* cited by examiner

Primary Examiner—Ricky Mack
Assistant Examiner—Brandi N Thomas
(74) Attorney, Agent, or Firm—Rosenberg, Klein & Lee

(57) ABSTRACT

A zoom lens control mechanism includes a lens barrel with a lens group arranged in advance therein, a lens barrel support portion for the lens barrel seated on, a guiding device and a driving device. The lens barrel has three cylinders with the same center, and each of the cylinders has a post disposed at the bottom edge thereof and arranged with the imaginary center of the cylinders on the same line. Each of the cylinders except the innermost cylinder further has an elongated slot extended along the outer surface thereof. The guiding device is received in the two elongated slots and fixed on the innermost cylinder for leading the cylinders of the lens barrel moving relatively along the optical axis in the range of the allowable deviation. The lens barrel support portion includes three protruding cylinders which have the same center thereof for mating with the corresponding cylinders of the lens barrel. Each of the protruding cylinders has plural projecting surfaces respectively for the corresponding post of the lens barrel seated on. The driving device is connected to the lens barrel support portion. In zooming operation, the driving device drives the lens barrel support portion rotating and consequently forcing the posts of the cylinders of the lens barrel to move respectively along the corresponding one of the projecting surfaces of the lens barrel support portion so as to effect zooming.

9 Claims, 2 Drawing Sheets

US 6,771,439 B2

ZOOM LENS CONTROL MECHANISM

BACKGROUND OF THE INVENTION

1. Field of the Invention

The present invention generally relates to a zoom lens control mechanism, as used in a camera and more particularly to a zoom lens control mechanism employing a nonlinear adjustment relationship and a novel cam structure to effect rapid and accurate zooming and focusing.

2. The Related Art

In a camera with a zoom lens group, a conventional zoom lens control mechanism usually use a bolt-transmission structure to effect zooming. Such zoom lens control mechanism includes a guide device, a bolt and a transmission device. The bolt is extended along the optical axis of the zoom lens group, and has a knob which is fixed on the end of the bolt, thereby the bolt driven to cycle with rotating the knob. The transmission device is fixed on the zoom lens group and meshes with the bolt, thereby transferring circumrotation of the bolt to the zoom lens group so as to lead the zoom lens group moving along the guide device.

However, in zooming operation, due to the conventional zoom lens control mechanism converting circumrotation of the bolt to linear moving of the zoom lens group according to the linear ratio as the displacement to the rotated angle, the right focus length can not be acquired once rapidly in such a gradual adjustment mode. Further, the bolt with high precision is required but difficult to be manufactured. Moreover, the transmission device has to be added so that the whole structure design of the zoom lens control mechanism becomes complex with the manufacture cost increasing.

Thus, it is desired to provide a novel zoom lens control mechanism structure to improve the foregoing drawbacks.

SUMMARY OF THE INVENTION

An object of the present invention is to provide a zoom lens control mechanism structure in which a group of coupled faces like cam surfaces are utilized to convert the circumrotation to relative linear moving corresponding to the nonlinear relationship between relative linear displacement and rotated angle.

Another object of the present invention is to provide a zoom lens control mechanism with simplified structure and reduced manufacture cost.

To achieve the above objects, in accordance with the present invention, there is provided a zoom lens control mechanism including a lens barrel, a lens barrel support portion for the lens barrel seated on, a guiding device and a driving device. The lens barrel has three different diameter cylinders with the same center, and each of the cylinders has a post disposed at the bottom edge thereof and arranged with the imaginary center of the cylinders on the same line. Each of the cylinders except the innermost cylinder further has an elongated slot extended along the outer surface thereof. The guiding device is received in the two elongated slots and fixed on the outer surface of the innermost cylinder for leading the cylinders of the lens barrel moving relatively along the optical axis in the range of the allowable deviation. The lens barrel support portion includes three different diameter protruding cylinders which have the same center for mating with the corresponding cylinders of the lens barrel. Each of the protruding cylinders has plural projecting surfaces respectively for the corresponding post of the lens barrel seated on. The driving device is connected to the lens barrel support portion. In zooming operation, the driving device drives the lens barrel support portion rotating and consequently forcing the posts of the cylinders of the lens barrel to move respectively along the corresponding one of the projecting surfaces of the lens barrel support portion so as to effect zooming.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
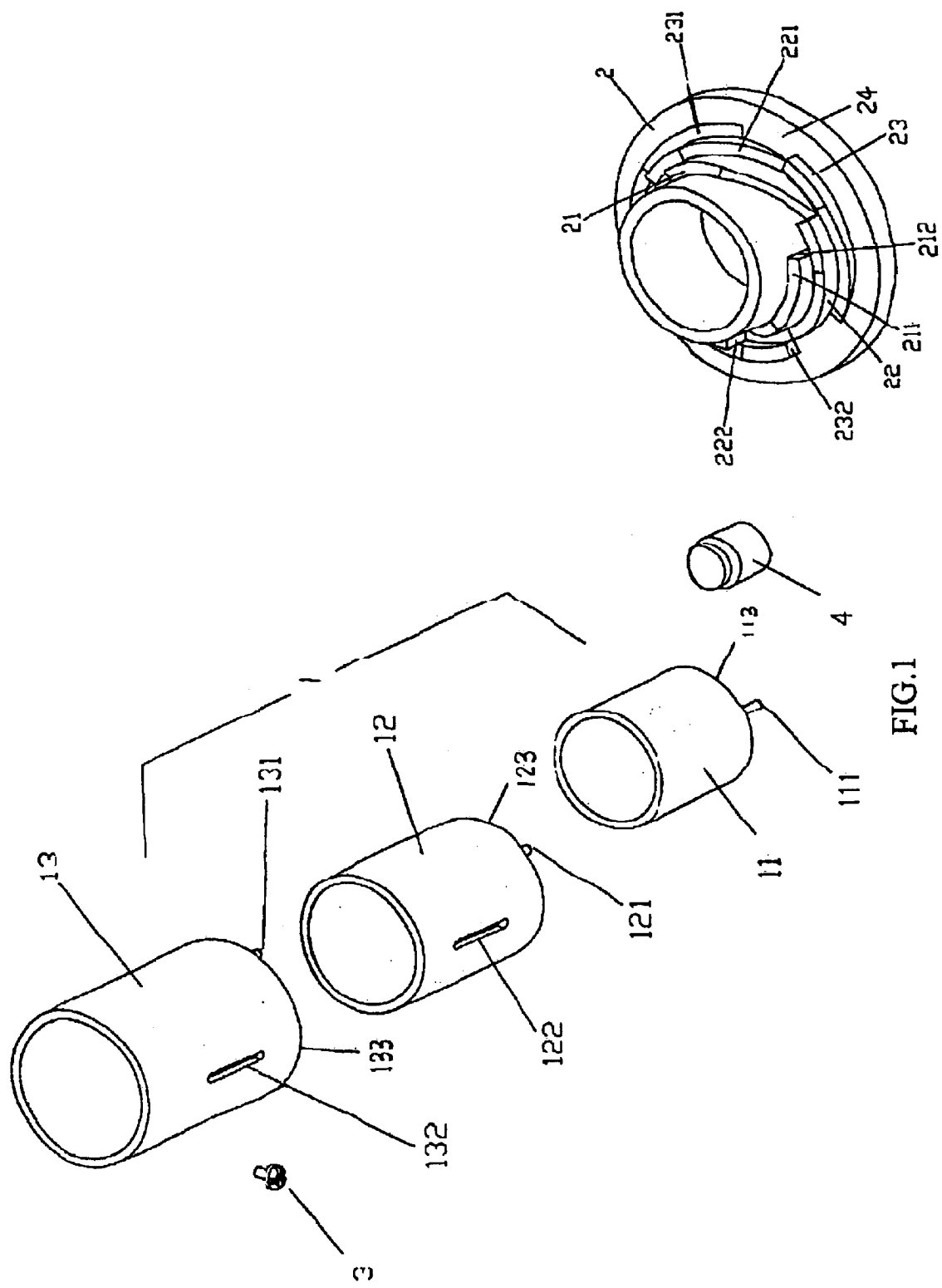
FIG. 1 is an exploded perspective view schematically showing a zoom lens control mechanism in accordance with a preferred embodiment of the present invention.

With reference to FIG. 1, a zoom lens control mechanism in accordance with the present invention comprises a lens barrel 1, a lens barrel support portion 2, a guiding device 3 and a driving device 4. The lens barrel 1 is seated on the lens barrel support portion 2 and has several lens groups (not shown) arranged in advance in the lens barrel 1. Each of lens group can be movable relatively to effect zooming. The guiding device 3 is disposed on the lens barrel 1 for leading the lens barrel 1 moving along the optical axis in the range of the allowable deviation. The guiding device 3 can be a bolt, a rivet, a steel ball and so on, therein the bolt is a better option. The driving device 4 is connected to the lens barrel support portion 2 for driving the lens barrel support portion 2 rotating and consequently forcing the lens barrel 1 seated on the lens barrel support portion 2 and the corresponding lens groups arranged in the lens barrel 1 to move so as to effect zooming. The driving device 4 can also be a stepping motor, a DC motor and so on, therein the stepping motor is a better option.

Furthermore, the lens barrel 1 includes at least two different diameter cylinders. There are three different diameter cylinders shown in FIG. 1, in which a first cylinder 11 is mounted in a second cylinder 12, and the second cylinder 12 is mounted in a third cylinder 13 which has the similar structure to the second cylinder 12. Each of the cylinders 11, 12 and 13 has at least a post 111, 121, 131 extended from the corresponding bottom edge 113, 123, 133 thereof. The three posts 111, 121 and 131 are of different length and arranged with the imaginary center line (not shown) of the cylinders 11, 12 and 13 shown in FIG. 1. The length of the three posts 111, 121 and 131 are degressive from inner to outer when the corresponding bottom edges 113, 123 and 133 of the three cylinders 11, 12 and 13 are on the same plane. That is, the first post 111 is longer than the second post 121, and the second post 121 is longer than the third post 131. Moreover, each of the second cylinder 12 and the third cylinder 13 further has an elongated slot 122 and 132 defined on the corresponding outer cylindrical surface thereof. The guiding device 3 is received in the two elongated slots 122 and 132 of the second and third cylinder 12 and 13, and fixed on the outer surface of the innermost first cylinder 11 for leading the three cylinders 11, 12 and 13 moving relatively along the optical axis in the range of the allowable deviation.

The lens barrel support portion 2 includes a base 24 and the corresponding amount and diameter of protruding cylinders which have the same center thereof projected from the base 24 for mating with the corresponding cylinders of the lens barrel 1. There are three different diameter protruding cylinders shown in FIG. 1, in which a first protruding cylinder 21 for mating with the first cylinder 11 of the lens barrel 1 is surrounded by a second protruding cylinder 22, the second protruding cylinder 22 for mating with the second cylinder 12 of the lens barrel 1 further is surrounded by a third protruding cylinder 23, and the third protruding cylinder 23 is used for mating with the third cylinder 13 of the lens barrel 1. Each of the protruding cylinders 21, 22 and 23 has corresponding amount of projecting surfaces according to the predetermined relative displacement between the lens group, wherein a first group of projecting surfaces of the first protruding cylinder 21 are denoted by 211, a second group of projecting surfaces of the second protruding cylinder 22 are denoted by 221 and a third group of projecting surfaces of the third protruding cylinder 23 are denoted by 231. Each of the projecting surfaces 211, 221 and 231 is arranged for forcing the corresponding post of the corresponding cylinder to move thereon during zooming operation and can also be a plane, an inclined plane, a combined plane of a plane and an inclined plane, etc. And besides, each of the projecting surfaces 211, 221 and 231 also has corresponding amount of separated portions 212, 222 and 232 adjacent thereto according to the zooming design of the lens group.

Figure 2:
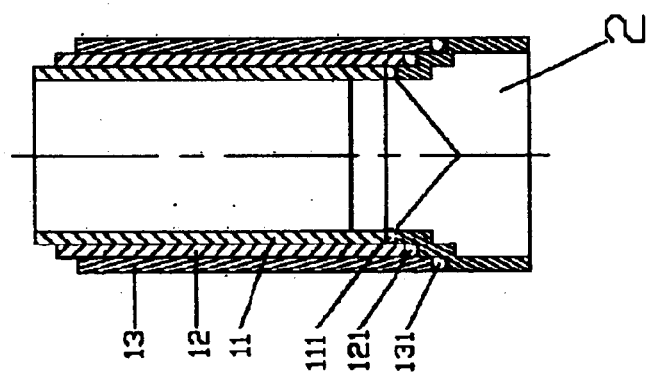
FIG. 2 is a cross-sectional view schematically showing the zoom lens control mechanism of FIG. 1 assembled.

With reference to FIGS. 1 and 2, during assembling, the lens barrel 1 is placed on the lens barrel support portion 2 to make the cylinders 11, 12 and 13 respectively corresponding to the protruding cylinders 21, 22 and 23, with the posts 111, 121 and 131 of the cylinder 11, 12 and 13 corresponding to the separated portions 212, 222 and 232 of the protruding cylinders 21, 22 and 23 adjacent to the projecting surfaces 211, 221 and 231. Then, a sleeve with a spring (not shown) is provided to receive the lens barrel 1 and the lens barrel support portion 2 except the base 24 for assembling together according to the existing art.

Figure 5:
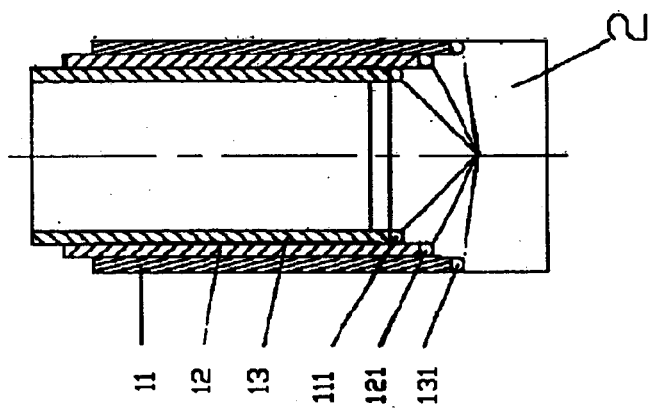
FIG. 5 is a schematic view of relative positions for the lens barrel and the lens barrel support portion at the longest focus length according to corresponding relative positions for posts of the lens barrel and projecting surfaces of the lens barrel support portion.
Figure 4:
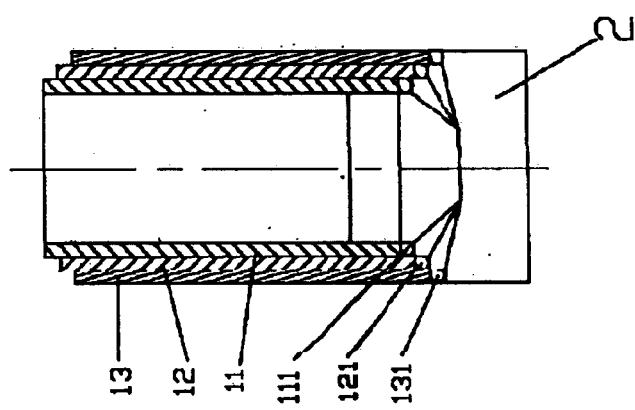
FIG. 4 is a schematic view of relative positions for the lens barrel and the lens barrel support portion at the medium focus length according to corresponding relative positions for posts of the lens barrel and projecting surfaces of the lens barrel support portion.
Figure 3:
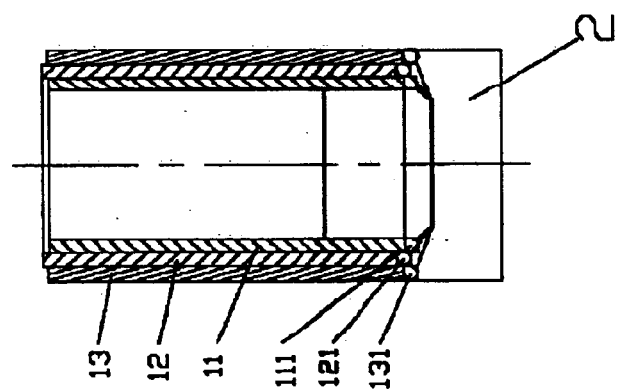
FIG. 3 is a schematic view of relative positions for the lens barrel and the lens barrel support portion at the shortest focus length according to corresponding relative positions for posts of the lens barrel and projecting surfaces of the lens barrel support portion.

Further with reference to FIGS. 3–5, the relative positions for the lens barrel 1 and the lens barrel support portion 2 are shown respectively at three different focus length. FIG. 3 shows the relative positions for the lens barrel 1 and the lens barrel support portion 2 at the shortest focus length in which the posts 111, 121 and 131 of the lens barrel 1 are located respectively on the lowest point of the corresponding one of the projecting surfaces 211, 221 and 231 of the lens barrel support portion 2.

In zooming operation, the driving device 4 drives the lens barrel support portion 2 rotating towards counter-clockwise with all the projecting surfaces 211, 221 and 231 of the lens barrel support portion 2. The rotating direction of the lens barrel support portion 2 is related to the projecting surfaces 211, 221, and 231. And then, the posts 111, 121 and 131 of the cylinders 11, 12 and 13 of the lens barrel 1 respectively seated on the corresponding one of the projecting surfaces 211, 221 and 231 of the protruding cylinders 21, 22 and 23 are driven simultaneously to move respectively along the corresponding one of the projecting surfaces 211, 221 and 231 of the protruding cylinders 21, 22 and 23 and away from the corresponding one of the separated portions 212, 222 and 232 to a suitable place in the linear direction parallel to the optical axis. As shown in FIG. 4, the relative positions for the lens barrel 1 and the lens barrel support portion 2 at the medium focus length in which the posts 111, 121 and 131 of the lens barrel 1 are located respectively on the certain point in the middle of the corresponding one of the projecting surfaces 211, 221 and 231 of the lens barrel support portion 2.

To focus on the longest focus length as shown in FIG. 5, the posts of 111, 121 and 131 of the cylinders 11, 12 and 13 are continued to be driven to move respectively along the corresponding projecting surface 211, 221 and 231 of the protruding cylinders 21, 22 and 23 in the linear direction parallel to the optical axis till located on the highest point of the corresponding one of the projecting surfaces 211, 221 and 231 of the lens barrel support portion 2.

According to the above preferred embodiment of the present invention, the zoom lens control mechanism utilizes the posts 111, 121 and 131 of the lens barrel 1 respectively driven by the corresponding one of the projecting surfaces 211, 221 and 231 of the lens barrel support portion 2 in a non-linear mode to effect rapid and accurate zooming. Further, the zoom lens control mechanism can reduce abrasions between elements in the zoom lens module and noise in operation by the non-linear cam transmission mode instead of the traditional linear bolt transmission mode. Moreover, the zoom lens control mechanism simplifies the structure of the zoom lens group with facility for manufacture and lower cost.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A zoom lens control mechanism comprising:
    a lens barrel, said lens barrel including at least a first cylinder and a second cylinder, said cylinders being longitudinally extended and coaxially arranged with respect to an optical axis, said first cylinder being telescopically mounted in said second cylinder, each of said cylinders having at least one post extending longitudinally from a bottom edge thereof, said second cylinder having a longitudinally extended slot formed in an outer surface thereof;
    a lens barrel support having a base portion and a plurality of protruding cylinders extending longitudinally from an upper surface from said base portion for respectively supporting said corresponding cylinders of said lens barrel seated thereon, each of said protruding cylinders having at least a one projecting surface extending in said longitudinal direction for contacting said post of said corresponding cylinder and linearly displacing said corresponding cylinder longitudinally responsive to a rotative displacement of said lens barrel support;
    a guiding device received in said slot of said second cylinder and fixed on an outer surface of said first cylinder for guiding movement of said cylinders along the optical axis through an allowable deviation; and a driving device connected to said lens barrel support for rotatively driving said lens barrel support.

2. The zoom lens control mechanism as claimed in claim 1, wherein said lens barrel further includes a third cylinder being coaxial with said first and second cylinders, said third cylinder having a corresponding structure to that of said second cylinder, said first and second cylinders being telescopically received in said third cylinder.

3. The zoom lens control mechanism as claimed in claim 2, wherein said third cylinder also has at least a post extending longitudinally from a bottom edge thereof and a slot extending longitudinally along the an outer surface thereof for receiving said guiding device therein.

4. The zoom lens control mechanism as claimed in claim 3, wherein said posts have a respective predetermined length, said length of said posts of said second and third cylinders respectively degressing from said length of said post of said first cylinder.

5. The zoom lens control mechanism as claimed in claim 2, wherein said lens barrel support portion further includes a third protruding cylinder extending longitudinally from an upper surface from said base portion for respectively supporting said third cylinder of said lens barrel seated thereon, said third protruding cylinder having at least one projecting surface extending in said longitudinal direction for contacting said post of said third cylinder and linearly displacing said third cylinder longitudinally responsive to said rotative displacement of said lens barrel support.

6. The zoom lens control mechanism as claimed in claim 1, wherein said lens barrel has a corresponding amount of lens groups arranged in advance therein.

7. The zoom lens control mechanism as claimed in claim 6, wherein an amount of said projecting surfaces of each of said protruding cylinders corresponds to a predetermined relative displacement between said lens groups.

8. The zoom lens control mechanism as claimed in claim 7, wherein each of said projecting surfaces has a corresponding amount of separated portions adjacent thereto.

9. The zoom lens control mechanism as claimed in claim 6, wherein a structure of each projecting surface is selected according to a zooming design of said lens groups.

* * * * *